(12) United States Patent
Funke et al.

(10) Patent No.: US 11,933,345 B2
(45) Date of Patent: Mar. 19, 2024

(54) TOLERANCE COMPENSATION ASSEMBLY

(71) Applicant: BÖLLHOFF VERBINDUNGSTECHNIK GmbH, Bielefeld (DE)

(72) Inventors: Thomas Funke, Rietberg (DE); Michael Kahre, Herford (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 18/265,216

(22) PCT Filed: Nov. 30, 2021

(86) PCT No.: PCT/EP2021/083566
§ 371 (c)(1),
(2) Date: Jun. 2, 2023

(87) PCT Pub. No.: WO2022/128448
PCT Pub. Date: Jun. 23, 2022

(65) Prior Publication Data
US 2023/0392626 A1 Dec. 7, 2023

(30) Foreign Application Priority Data
Dec. 16, 2020 (DE) .......................... 102020133763.9

(51) Int. Cl.
*F16B 5/02* (2006.01)
(52) U.S. Cl.
CPC ............ *F16B 5/0233* (2013.01); *F16B 5/025* (2013.01); *F16B 5/02* (2013.01)
(58) Field of Classification Search
CPC .......... F16B 5/02; F16B 5/0233; F16B 5/025; F16B 5/0283

(Continued)

(56) References Cited

U.S. PATENT DOCUMENTS

| 5,340,258 A | 8/1994 | Simon |
| 6,062,791 A | 5/2000 | Simon |

(Continued)

FOREIGN PATENT DOCUMENTS

| DE | 102005037192 A1 | 2/2007 |
| DE | 102007037242 A1 | 2/2008 |

(Continued)

OTHER PUBLICATIONS

Written Opinion & International Search Report for PCT/EP2021/083566 dated Mar. 18, 2022, (13 pages).

(Continued)

*Primary Examiner* — Roberta S Delisle
(74) *Attorney, Agent, or Firm* — Reising Ethington P.C.

(57) ABSTRACT

A tolerance compensation arrangement for fastening first and second components with tolerance compensation in the distance between the first and second component, has a base unit with a cage element, a base element, a nut in the cage element, and an adjustment unit having a threaded sleeve with an outer thread and a dragging element. The thread of the threaded sleeve forms with the nut a first thread pairing of a first direction. A fastening screw can be inserted through an opening of the base unit and the adjustment unit, and the fastening screw is screwable into the base element via a second thread pairing of a second thread direction and is connectable to the adjustment unit via the dragging element, so that, when the fastening screw is screwed in, the adjustment unit is co-rotated and thereby moved into abutment with the second component.

15 Claims, 9 Drawing Sheets

(58) Field of Classification Search
USPC .......................................... 411/383, 384, 432
See application file for complete search history.

(56) References Cited

U.S. PATENT DOCUMENTS

| | | | |
|---|---|---|---|
| 6,357,953 B1* | 3/2002 | Ballantyne | F16B 5/0233 |
| | | | 403/372 |
| 6,585,447 B2 | 7/2003 | Schwarzbich | |
| 8,202,033 B2 | 6/2012 | Choi et al. | |
| 8,864,432 B2 | 10/2014 | Figge et al. | |
| 9,074,614 B2 | 7/2015 | Schwarzbich | |
| 9,464,659 B2 | 10/2016 | Schwarzbich | |
| 9,829,020 B2 | 11/2017 | Dona | |
| 10,145,399 B2 | 12/2018 | Haselberger et al. | |
| 10,557,488 B2 | 2/2020 | Bräutigam | |
| 10,907,673 B2 | 2/2021 | Schwarzbich | |
| 2002/0076269 A1* | 6/2002 | Schwarzbich | F16B 5/0233 |
| | | | 403/167 |
| 2007/0092355 A1* | 4/2007 | Burger | F16B 5/0233 |
| | | | 411/551 |
| 2012/0090146 A1* | 4/2012 | Figge | F16B 5/025 |
| | | | 29/428 |
| 2015/0330435 A1* | 11/2015 | Schwarzbich | F16B 5/0283 |
| | | | 411/16 |
| 2020/0248733 A1* | 8/2020 | Figge | F16B 5/025 |
| 2022/0299051 A1* | 9/2022 | Bente | F16B 5/0283 |

FOREIGN PATENT DOCUMENTS

| | | |
|---|---|---|
| DE | 102009044635 A1 | 12/2010 |
| DE | 102012110352 A1 | 5/2013 |
| DE | 102012007996 A1 | 10/2013 |
| DE | 202012102440 U1 | 10/2013 |
| DE | 102013216716 A1 | 2/2015 |
| DE | 102015103491 A1 | 8/2016 |
| EP | 0543046 A1 | 5/1993 |
| EP | 0886071 A1 | 12/1998 |
| EP | 1215401 B1 | 1/2005 |
| EP | 2951447 A1 | 12/2015 |
| WO | WO2010022841 A1 | 3/2010 |
| WO | WO2015131218 A1 | 9/2015 |
| WO | WO2014120707 A1 | 8/2017 |
| WO | WO2018054785 A1 | 3/2018 |

OTHER PUBLICATIONS

English Translation of Written Opinion & International Search Report for PCT/EP2021/083566 dated Mar. 18, 2022, (7 pages).

English translation of the International Preliminary Report on Patentability for PCT/EP2021/083566 dated Jun. 13, 2023, (6 pages).

* cited by examiner

TOLERANCE COMPENSATION ASSEMBLY

TECHNICAL FIELD

The present disclosure relates to a tolerance compensation arrangement for fastening a first component to a second component with automatic compensation of tolerances in the distance between the first and the second component. Also, the present disclosure relates to a first component in combination with a tolerance compensation arrangement, a first and a second component which are fastened to each other via a tolerance compensation arrangement by means of a screw as well as a manufacturing method for a tolerance compensation arrangement.

BACKGROUND

Tolerance compensation arrangements are known in great variety. They are usually comprised of an adjustment bushing with a so-called drag section, which can form a frictional connection with a fastening screw. When the fastening screw is rotated, the adjustment bushing is therefore co-rotated until it abuts one of the two components, whereupon the frictional connection is overcome when the fastening screw is further rotated and the torque is increased accordingly, so that the two components can then be braced together by the fastening screw via the adjustment bushing.

In this regard, DE 20 2012 102 440 U1 describes a tolerance compensation element with at least two supporting bodies which are in threaded engagement with each other in such a manner that the axial dimension of the tolerance compensation element is adjustable by relative rotation of the supporting bodies. At least one of the supporting bodies comprises a coil spring wound from a wire with a non-rectangular cross-section and forming the thread of this supporting body. The tolerance compensation element is retained by means of claws in a component, which comprises a thread bore for engagement with a fastening screw.

A further tolerance compensation element is described in DE 10 2012 110 352 A1. This tolerance compensation element comprises at least two supporting bodies, at least one of which comprises a helically extending supporting face via which the supporting bodies are supported against each other such that the axial dimension of the tolerance compensation element can be adjusted by relative rotation of the supporting bodies. At least one of the supporting bodies is a helical spring and the supporting body supported on it comprises a web which engages between the turns of the helical spring. Here too, the tolerance compensation element is fastened in the component by means of claws, wherein the component comprises a thread bore for engagement with a fastening screw.

DE 10 2013 216 716 A1 describes a further tolerance compensation device. Here the tolerance compensation device comprises a base element which defines an axial direction, a compensation element which is movable relative to the base element to compensate tolerances between the components to be connected, and a securing means to secure the compensation element against movement relative to the base element. The securing means is releasable independently of a movement of the compensation element relative to the base element.

It is a disadvantage of these arrangements that the drag section is not beared in a floating manner. Therefore, a misalignment of the fastening screw when inserted into the adjustment element cannot be compensated. These tolerance compensation arrangements therefore require a high degree of precision in use.

A further fastening arrangement with tolerance compensation is described in WO 2010/022841 A1. The arrangement comprises a receiving element and an adjustment element which is screwed to the receiving element via a first thread pairing of a first thread direction. Through an opening in the receiving element and in the adjustment element, a fastening screw is insertable, which can be screwed into the receiving element via a second thread pairing of a second thread direction opposite to the first and which is connectable with the adjustment element via a releasable dragging connection. In this way, when the fastening screw is rotated, the adjusting element is co-rotated and thus moved into abutment with the second component. The adjustment element is comprised of a dragging element arranged rotationally fixed and floating within a thread element, so that a misalignment of the fastening screw during insertion into the adjustment element can be compensated.

A further disadvantage of these known arrangements is that the adjustment unit may be unscrewed from the base unit during use. In this case it often is not possible to bring the adjustment unit into threaded engagement with the base unit any more. A disassembly of the arrangement or a non-destructive removal or a demounting can therefore no longer be realized.

In the prior art, various solutions are known for solving this problem and to prevent an adjustment unit from being unscrewed from a base unit. EP 0 543 046 A1, for example, describes a screw unit that serves to bridge distances between components in a manner that can be adjusted and locked. It comprises a screw peg with a central bore, a screw nut which is turned thereon and a locking device which holds it in the set position. In order to be able to cover a larger adjustment range using the screw unit, which is shown as a separate structural element, the screw nut is constructed as a supporting sleeve having an inner thread with positioning faces arranged in certain portions, into which the screw peg, which also has positioning faces, can be screwed approximately flush.

A similar screw unit is described in EP 0 886 071 A1. Here, the support sleeve is provided with an internally protruding annular collar comprising the inner thread at its end facing an adjusting collar, while a stop member is arranged as a turning or screwing out protection or locking at the free end of the screw peg. In order to be able to carry out not only a height adjustment but also a displacement transversely to the height direction, the support sleeve is displaceably fixed transversely to the longitudinal axis of the screw unit on a sliding support member fixed opposite a spacer component.

From DE 10 2005 037 192 A1, a modularly composed bracing device is known. The device for fastening two components in a bracing manner at a distance from each other comprises a base body with inclined faces which is inserted into a retaining ring with which the device is fastenable to the first component. Furthermore, the device comprises a spacer body, which has counter-inclined faces resting on the inclined faces and a spring element, the spring tongues of which can enter into frictional lateral surface abutment against a connecting screw penetrating the device and connecting the two components to each other, so that by rotation of the connecting screw the spacer body is displaced into a supporting position, in which a stop ring rotationally fixed on the spacer body acts against the second component. The stop ring is retained in a default position of the device by a transport locking device to inhibit rotation. The transport locking device is formed by a locking cap assigned to the base body.

A further tolerance compensation arrangement with a screw-out protection is known from DE 10 2012 007 996 A1. The tolerance compensation arrangement comprises a base element fastenable to a first component and a rotatably mounted compensation element in threaded engagement with the base element, which can be moved along an axial extension direction by a rotational movement relative to the base element. The threaded engagement further comprises a locking device which is formed to block further rotational movement of the compensating element relative to the base element when the compensating element reaches a predetermined extension position relative to the base element.

According to EP 2 951 447 A1, a compensation nut is provided which is formed by a combination of an upper part, one or more intermediate nuts and a base clip or nut. The upper part, the one or more intermediate nuts and the base clip or nut are each provided with threads that allow a mutual connection and mutual retraction or expansion by means of a single screwing operation. All threads are each provided with stops that limit their relative displacement.

In WO 2015/131218 A1, a device for connecting a structural element with a retaining element at a distance from each other by means of a connecting screw is described. The device comprises a distance-compensating element, which has a longitudinal bore for the passage of the connecting screw, and a dragging element arranged in the longitudinal bore and connectable to the connecting screw by frictional engagement, so that, by screwing in the connecting screw, the distance-compensating element can be transferred into an abutment position bridging the distance between the structural element and the retaining element. The distance compensation element is connected via a threaded connection to an insertion part which has a fastening section that can be arranged within the structural element for bonding to the structural element.

DE 10 2015 103 491 A1 describes a spacer nut. The spacer nut for connecting spaced apart fastening sections of two components comprises a threaded part forming an inner thread for a screw and an intermediate piece forming a thread and a passage opening. The threaded part and the intermediate piece are connectable or connected in such a manner that a receiving space for the fastening section of a first component is formed between them and the inner thread and the passage opening are arranged in alignment in the intermediate piece. Furthermore, a spacer piece with a thread is provided, which is screwable with the thread of the intermediate piece, comprises a passage opening aligned flush with the inner thread as well as a contact face integrating the one end of the passage opening of the spacer piece, which is provided for abutment against the fastening section of the second component. The spacer nut may comprise a thread locking device which prevents the spacer piece from being unscrewed from the intermediate piece starting from at least one locking position or at least requires an increased handling force (compared to a normal handling force). Here the locking position can be arranged at the end and/or at the beginning of the unscrewing path of the spacer piece.

Finally, WO 2018/054785 A1 provides a tolerance compensation element for a device used to connect components by means of a connecting screw inserted through the tolerance compensation element. The tolerance compensation element comprises an inner and an outer threaded part, which are in threaded engagement with each other and together form a spacer adjustable in length, and a sleeve retained in the inner threaded part, which retains a spring element in a position in which it comes into frictional contact with the circumference of the inserted connecting screw. Furthermore, a rotation locking device in the form of a ring is provided, which is rotatably supported at one end of the spacer and comprises at least one arm projecting axially into the sleeve, which at the free end forms an outwardly cranked claw against which a stop formed on the sleeve abuts when a maximum unscrewing path of the inner threaded part is reached.

The object of at least some implementations of the present disclosure is to provide an alternative construction of a tolerance compensation arrangement, which is optimized with respect to the known prior art tolerance compensation arrangements, especially with respect to the screwing out protection.

SUMMARY

The above object is solved by a tolerance compensation arrangement for fastening a first component to a second component with automatic compensation of tolerances in the distance between the first component and the second component, a first component in combination with a tolerance compensation arrangement, a first and a second component fastened to each other via the tolerance compensation arrangement by means of a fastening screw as well as a manufacturing method for a tolerance compensation arrangement. Advantageous embodiments and further developments arise from the following description, the drawings as well as the appending claims.

A tolerance compensation arrangement for fastening a first component to a second component with automatic compensation of tolerances in the distance between the first component and the second component comprises the following features: a base unit having a cage element comprising a passage opening in the interior as well as a fastening structure on its outer side for fastening in the first component, a base element arranged with a first axial end in the cage element and having an inner thread at the opposite second axial end, and a nut arranged in a rotationally fixed and floatingly beared manner in the cage element adjacent to the first axial end of the base element wherein the nut provides an inner thread, and an adjustment unit comprising a threaded sleeve with an outer thread and a dragging element arranged therein with at least one radially inwardly projecting spring arm, wherein the outer thread of the threaded sleeve forms with the inner thread of the nut a first thread pairing of a first thread direction, wherein the adjustment unit comprises an axial extension opposite to the first thread direction which forms with the base unit a screwing out protection of the adjustment unit, while a fastening screw is insertable through an opening of the base unit and the adjustment unit, which is screwable into the inner thread of the base element by means of a second thread pairing of a second thread direction opposite to the first thread direction and is connectable to the adjustment unit via the dragging element by means of a releasable dragging connection so that, when the fastening screw is screwed in, the adjustment unit is co-rotated and is thereby moved into abutment with the second component.

In the following, the tolerance compensation arrangement is illustrated by its use. It is assumed here that the tolerance compensation arrangement is already fastened in a first component. Such a fastening is made by the fastening structure of the cage element. For example, the cage element as fastening structure comprises two spring arms arranged opposite to each other as well as two retaining structures circumferentially displaced thereto, each of which is formed by two projections. Here, a first projection of the retaining structures is arranged adjacent to the first end of the cage element and the respective second projection has a distance to the first projection in axial direction so that the first component can be arranged in the gap formed therebetween. In addition, the first projections comprise a circumferential expansion as well as an expansion radially outwards which is greater than the circumferential expansion of the second projections.

A cage element designed in this way can, for example, be fastened in a round opening in the first component, which comprises two additional notches or recesses arranged opposite to each other. For this, the retaining structures, in particular the second projections of the retaining structures, are aligned with the additional notches or recesses and the cage element is inserted in the component in this state until the first projections abut the first component. In this state the spring arms partially engage in the opening in the first component. Now the cage element is rotated until the spring arms snap into the additional notches or recesses. In this state, an extraction or pull-out protection is provided by the retaining structures, as the first component is arranged between the first and the second projection, respectively. The spring arms in the additional recesses of the opening provide a rotation protection.

Alternatively, the cage element can also comprise an outer form with an outer thread. By means of this outer thread, the base element can be screwed into a corresponding circular opening in the first component.

A second component is arranged above the first component, wherein an opening in the second component may be aligned with the opening in the first component. A fastening screw, which may be made of metal, is passed through the opening in the second component to fasten the second component and engages with the dragging element of the adjustment unit. The fastening screw forms a releasable dragging connection with the dragging element, which may be made of plastic, so that when the fastening screw is rotated, the adjustment unit is co-rotated and thus the adjustment unit is moved into abutment with the second component for the purpose of tolerance compensation. When rotating the fastening screw further, in which the dragging connection is overcome with a corresponding increase in torque, the fastening screw comes into engagement with the inner thread of the base element so that the two components can then be braced together by the fastening screw via the adjustment unit.

The cage element, which may be made of plastic, together with the base element and the nut, which may be made of metal, form the so-called base unit. The base unit is thus comprised of three components. To secure the base element and the nut in the cage element in the axial direction, the cage element may comprise a locking structure on the inside. In this way, for example, the first axial end of the base element and the nut can be retained between a step in the interior of the cage element and the locking structure, which is formed by one or more locking hooks, for example.

The base element and the nut may be made of the same metal, for example steel. It is important that the base element and the nut are arranged rotationally fixed in the cage element so that they do not co-rotate when the threaded sleeve and the fastening screw are rotated in or out. For this purpose, the base element and the nut may comprise a rotation-inhibiting outer contour which in cooperation with the corresponding inner contour of the cage element prevents the base element and the nut from co-rotating. Such a rotation-inhibiting outer contour can be any angular or non-round outer contour, but also any round outer contour with a projection that engages in a recess in the cage element and thus prevents a co-rotation.

The nut interacts with the threaded sleeve of the adjustment unit, which may also be made of metal, and so forms the first thread pairing of the first thread direction. For example, the inner thread of the nut and the outer thread of the threaded sleeve are each left-hand or counter-clockwise threads. The base element interacts with the fastening screw and thus forms the second thread pairing of the second thread direction. In relation to the first thread direction defined by a left-hand thread, the second thread direction is then defined by a right-hand or clockwise thread.

An advantage of the tolerance compensation arrangement is first of all that, compared to a pure plastic tolerance compensation arrangement, higher strengths of the connection between the components to be connected can be achieved. This may be achieved due to the first and second thread pairing made of metal, such as steel.

A further advantage results from the nut arranged in a floatingly beared manner in the cage element. In this way, any misalignment of the fastening screw when inserted into the adjustment unit can be compensated. Since the nut is beared floatingly, the adjustment unit as a whole is arranged floatingly and, in relation to its longitudinal axis, is able to carry out radial or lateral compensation movements within the cage element.

Finally, the axial extension of the adjustment unit opposite the first thread direction, i.e. in the direction of the second end of the base element, provides the advantage that the adjustment unit is secured against unscrewing from the nut of the base unit by means of a turning or screwing out protection or locking. The axial extension, as discussed later with reference to the embodiments, may be an integral part of the adjustment unit and is not formed by a separate component. In addition, the screwing out protection of the adjustment unit may be subjected to tensile loads in the loaded stop or final state, which is also illustrated by the embodiments. As a result, with this construction a particularly effective, integrated screwing out protection may be provided, which is a cost-effective and advantageous alternative to the known screwing out protections.

In a further embodiment of the tolerance compensation arrangement, the cage element comprises two locking hooks arranged opposite to each other radially inside adjacent to a passage opening, so that the first axial end of the base element and the nut are arranged between the locking hooks and a step in the interior of the cage element in an axial direction in a captive or loss-proof manner. As shown above, this is one possibility of designing the locking structure in the interior of the cage element and arranging the base element as well as the nut therein in a loss-proof manner.

In another embodiment of the tolerance compensation arrangement, the dragging element comprises the axial extension so that the dragging element is arranged with a first axial end adjacent to a first axial end of the threaded sleeve. In this context, the axial extension may comprise at least partially a projection which projects radially outwards beyond the core diameter of the outer thread of the threaded sleeve. In other words, the axial extension formed at the dragging element projects from the threaded sleeve in the direction of insertion of the fastening screw or in the direction of the second axial end of the base element. Since the radially outward projection on the axial extension extends not only beyond the inner diameter of the threaded sleeve but also beyond the core diameter of the outer thread of the threaded sleeve, this projection will, in a final state, abut at the inner thread of the nut, for example. In this way, the projection is particularly effective in blocking an unscrewing of the threaded sleeve from the nut.

In a further embodiment of the tolerance compensation arrangement, the dragging element comprises two axial extensions, each of which comprises a projection projecting radially outwards beyond the core diameter of the outer thread of the threaded sleeve, wherein the axial extensions may be arranged circumferentially displaced to two spring arms of the dragging element. In other words, the dragging element may comprise the same number of axial projections as spring arms. The spring arms and the axial extensions are advantageously arranged circumferentially alternately. With this design, the dragging element can be adapted particularly effectively to the connection to be realized.

Advantageously, the adjustment unit also includes a washer adjacent to a second axial end of the threaded sleeve, wherein the dragging element is retained in and/or at the threaded sleeve by means of a press-fit or interference fit and/or by means of a form-fit. The washer, like the threaded sleeve, may be made of metal, for example the same metal and especially steel. With regard to the arrangement of the dragging element by means of a press-fit or interference fit in the threaded sleeve, reference is made to application DE 10 2007 037 242 A1. For the sake of completeness it is pointed out that an interference fit or press-fit is a frictional fit and thus a frictional connection.

In a further embodiment, the second axial end of the dragging element may be arranged flush with a first side of the washer. A second side of the washer opposite to the first side abuts the threaded sleeve. With this design, the washer or abutment washer abuts the second component in the installed state, so that an improved force transmission is realized.

Advantageously, the dragging element comprises adjacent to the second axial end at least one radial projection, which may be two radial projections arranged opposite to each other, wherein the at least one radial projection cooperates or interacts with a recess of the washer. In addition to a positionally correct assembly of the dragging element in the washer and thus in the adjustment unit, a rotation protection of the dragging element in the washer is realized in this way.

In a further embodiment of the tolerance compensation arrangement, the base element, the nut, the threaded sleeve and the washer are made of metal and the cage element as well as the dragging element may be made of plastic, as already shown above. In this way, a high degree of stability can be achieved due to the metal elements on the one hand, while the plastic elements ensure an economically producible tolerance compensation arrangement on the other.

A first component comprises a tolerance compensation arrangement, wherein the tolerance compensation arrangement is fastened in the first component by means of the fastening structure of the cage element. For this purpose, the cage element of the tolerance compensation arrangement comprises two spring arms arranged opposite to each other as well as two retaining structures circumferentially displaced thereto, which are each formed by two projections. In an alternative embodiment, the cage element and thus the tolerance compensation arrangement are fastenable by means of a thread in the opening in the first component. According to another alternative, any kind of locking structure can be used as a fastening structure, as known from a plurality in the prior art. As a result, the first component in combination with the tolerance compensation arrangement comprises the advantages of the tolerance compensation arrangement described above, so that reference is made to the respective explanations.

A first and a second component are fastened to each other via an embodiment of the above described tolerance compensation arrangement as well as by means of a fastening screw. The fastening screw may be made of metal, which may be steel. In this way, the second thread pairing of the second thread direction also comprises a metal-to-metal connection. The components fastened to each other also comprise the advantages of the tolerance compensation arrangement described above, so that, in this context, reference is also made to the respective explanations.

A manufacturing method for a tolerance compensation arrangement comprises the following steps: providing a base unit comprised of a cage element, a base element and a nut, providing an adjustment unit which comprises a threaded sleeve with an outer thread and a dragging element with at least one radially inwardly projecting spring arm, thereafter screwing the threaded sleeve into the nut, wherein the outer thread of the threaded sleeve forms with the inner thread of the nut a first thread pairing of a first thread direction, wherein the adjustment unit has an axial extension opposite to the first thread direction which forms with the base unit a screwing out protection of the adjustment unit. With the manufactured tolerance compensation arrangement, the advantages described above can be realized, so that reference is again made to the respective explanations.

In a further embodiment, the step of providing the base unit comprises bending up locking hooks inside the cage element as well as inserting the base element and the nut into the cage element so that the base element is arranged with a first axial end in the cage element and the nut is arranged rotationally fixed and in a floatingly beared manner in the cage element adjacent to the first axial end of the base element, wherein the locking hooks provide a loss protection for the base element and the nut in axial direction after the inserting of the base element and the nut. In this way, the base element and the nut are arranged in a captive or loss-proof manner in the cage element.

The method includes the step: providing a washer adjacent to a second axial end of the threaded sleeve and inserting the dragging element into the threaded sleeve and the washer, wherein the dragging element comprises the axial extension so that the dragging element is arranged with a first axial end adjacent to a first axial end of the threaded sleeve. In this context, the axial extension may comprise at least partially a projection projecting radially outwards beyond the core diameter of the outer thread of the threaded sleeve. In other words, the axial extension formed on the dragging element projects from the threaded sleeve in the direction of insertion of the fastening screw. Since the radially outwardly projecting projection on the axial extension extends not only beyond the inner diameter but also beyond the core diameter of the outer thread of the threaded sleeve, this projection abuts for example at the inner thread of the nut in a loaded or locking state. In this way, the projection is particularly effective in blocking an unscrewing of the threaded sleeve from the nut.

In another embodiment of the manufacturing method, the dragging element may be retained in and/or at the threaded sleeve by means of a press-fit or interference fit and/or by means of a form-fit. With regard to the arrangement of the dragging element in the threaded sleeve by means of an interference fit, reference is again made to application DE 10 2007 037 242 A1.

Finally, with regard to the manufacturing method, the base element, nut, threaded sleeve and washer may be made of metal and the cage element as well as the dragging element may be made of plastic. With this material combination on the one hand a stable metal-to-metal thread pairing may be realized, especially if the fastening screw is also made of metal. On the other hand, the tolerance compensation arrangement can still be produced economically due to the plastic elements used.

BRIEF DESCRIPTION OF THE DRAWINGS

In the following, the present disclosure is described in detail with reference to the drawings. Identical reference signs in the drawings indicate identical components and/or elements. Showing.

DETAILED DESCRIPTION

In the following, an embodiment of a tolerance compensation arrangement 1 according to the present disclosure is described in detail. The tolerance compensation arrangement 1 is an arrangement for fastening a first component A to a second component B with automatic compensation of tolerances in the distance between the first component A and the second component B.

Figure 1:
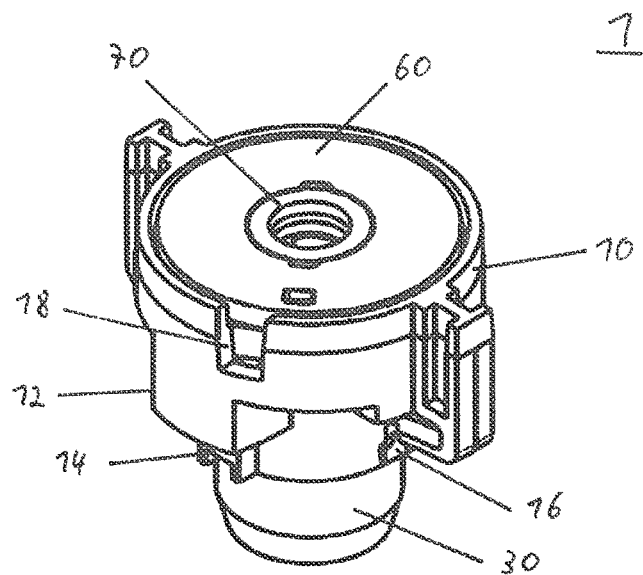
FIG. 1 a perspective view of an embodiment of the tolerance compensation arrangement, FIG. 2 a partial sectional view of the embodiment according to FIG. 1, FIG. 3 a top view of the embodiment according to FIG. 1, FIG. 4 a top view of a cage element of the embodiment according to FIG. 1, FIG. 5 an exploded view of a base unit of the embodiment according to FIG. 1, FIG. 6 a sectional view of the base unit according to FIG. 5, FIG. 7 an exploded view of an adjustment unit of the embodiment according to FIG. 1 in combination with the base unit according to FIG. 6, FIG. 8 a sectional view of the adjustment unit inserted in the base unit according to FIG. 7, FIG. 9 a perspective view of a dragging element according to the embodiment of the tolerance compensation arrangement according to FIG. 1, FIG. 10 a bottom view of the dragging element according to FIG. 9, FIG. 11 an enlarged view of a section of the dragging element according to FIG. 10, FIG. 12 a side view of the dragging element according to FIG. 9, FIG. 13 a top view of the dragging element according to FIG. 9, FIG. 14 a sectional view of the dragging element according to FIG. 9, FIG. 15 a top view of an opening in the first component, FIG. 16 a partial sectional view of an embodiment of the tolerance compensation arrangement in an installed state, FIG. 17 a perspective sectional view of the screwing out protection in the embodiment according to FIG. 1, FIG. 18 a sectional view of the screwing out protection according to FIG. 17, and FIG. 19 a schematic method sequence of an embodiment of a manufacturing method for the tolerance compensation arrangement.
Figure 2:
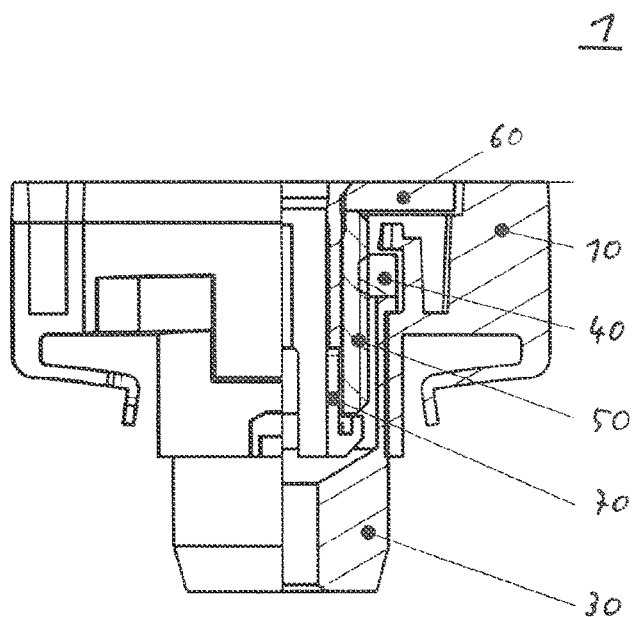
Figure 3:
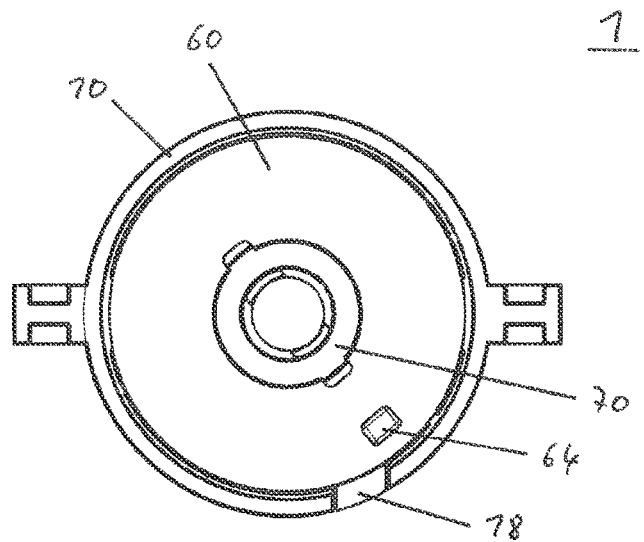

Referring to FIGS. 1 to 3, the tolerance compensation arrangement 1 consists of a base unit 3 and an adjustment unit 5. The base unit 3 is formed by a cage element 10, a base element 30 and a nut 40. Thus, the base unit 3 comprises three separate components. The adjustment unit 5 comprises a threaded sleeve 50, an abutment washer or washer 60 as well as a dragging element 70. Accordingly, the adjustment unit 5 is also comprised of three separate components.

In the discussed embodiment, the cage element 10 as well as the dragging element 70 are made of plastic and were manufactured, for example, by injection molding. The remaining components base element 30, nut 40, threaded sleeve 50 and washer 60 are made of metal. Other materials are possible, depending on the desired field of application and the properties of the tolerance compensation arrangement 1 to be realized.

A fastening of the tolerance compensation arrangement 1 in the first component A is achieved by means of a fastening structure provided on the outer side of the cage element 10. In particular, FIGS. 1 and 2 show that the cage element 10 as a fastening structure may comprise two retaining structures, each formed by a first projection 12 and a second projection 14. Furthermore, two spring arms 16 arranged opposite to each other are provided, which are circumferentially displaced to the first 12 and the second projection 14. The first projection 12 of the retaining structure is arranged adjacent to the first end of the cage element 10 and the second projection 14 comprises a distance from the first projection in the axial direction so that the first component A is arrangeable in the gap formed between them. The first projection 12 comprises a circumferential expansion as well as an expansion radially outwards which is larger than the respective expansion of the second projection 14.

Figure 15:
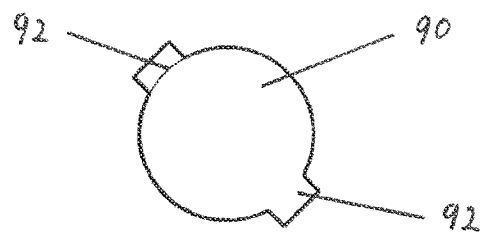

A cage element 10 designed in this way can, for example, be fastened in a round opening 90 in the first component A, which comprises two additional notches or recesses 92 arranged opposite to each other. A corresponding opening 90 in the first component A is shown in FIG. 15. For fastening, the second projections 14 are aligned with the additional notches or recesses 92 and the cage element 10 is inserted in this state into the first component A until the first projections 12 abut at the first component A. In this state the spring arms 16 partially engage in the opening 90 in the first component A.

Now the cage element 10 is rotated until the spring arms 16 snap into the additional notches or recesses 92. In this state, an extraction or pull-out protection in axial direction is provided by the first 12 and second projections 14, as the first component A is arranged between the first 12 and the second projection 14, respectively. The spring arms 16 in the additional recesses 92 of the opening 90 provide a rotation protection.

Figure 4:
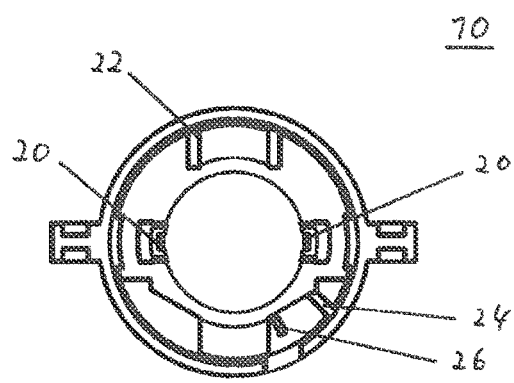

Referring to FIGS. 4 to 8, the structure of the tolerance compensation arrangement 1 is explained using the assembly of the individual components. FIG. 4 shows a top view of the cage element 10. Here, it can be seen that the cage element 10 comprises a recess 18. This recess serves for the positionally correct assembly, so that the cage element 10 and thus later the tolerance compensation arrangement 1 can be processed automatically.

On the inside, the cage element 10 comprises a passage opening and two locking hooks 20 arranged opposite to each other. The locking hooks 20 serve for fastening a first axial end 32 of the base element 30 as well as the nut 40. This is because the locking hooks 20 can be used to fasten the first axial end 32 of the base element 30 and the nut 40 between the locking hooks 20 and a step formed inside the cage element 10 in the axial direction or to restrict their freedom of movement.

In order to allow further fixation of the base element 30 inside the cage element 10, the cage element 10 comprises a limiting or boundary structure 22. In the example shown, this is formed by two projections projecting radially inwards. The functionality becomes particularly clear with regard to FIG. 7.

Furthermore, the cage element 10 comprises a stop 24 as well as a transport protection 26, which in its initial state interacts with a cam or lobe 64 of the washer 60 of the adjustment unit 5. This will also become clear later with reference to FIG. 7.

Figure 5:
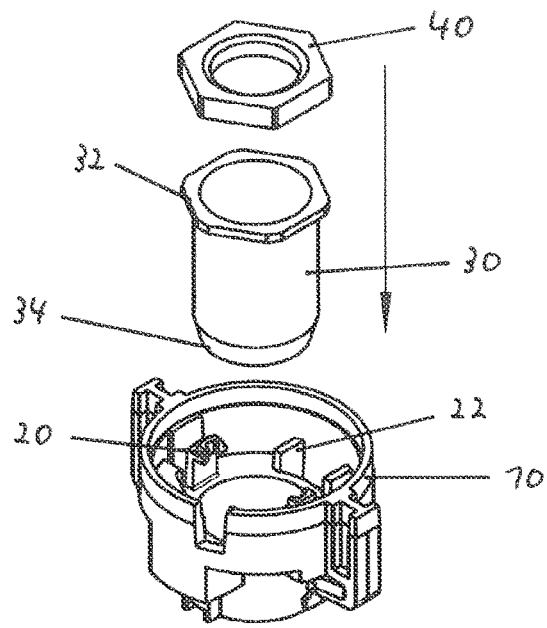
Figure 6:
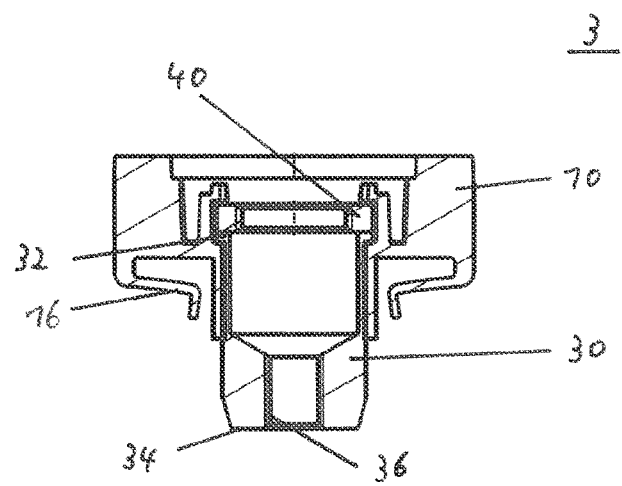

Now referring to FIG. 5, an inserting of the base element 30 as well as the nut 40 into the cage element 10 takes place. For this purpose, the locking hooks 20 are first bent open. Then, first the base element 30 is inserted into the cage element 10 with a second axial end 34 ahead. As can be seen in FIG. 6, the second axial end 34 of the base element 30 comprises a chamfer on the outside to facilitate the insertion. Inside the base element 30, the second axial end 34 has an inner thread 36 which comes into engagement when used with a fastening screw 7.

A first axial end 32 of the base element 30 rests after insertion on a step formed inside the cage element 10. It is important that the base element 30 is arranged rotationally fixed in the cage element 10 so that it does not rotate when the fixing screw 7 is screwed in or out. For this purpose, the base element 30 comprises an outer contour in the form of a hexagon as a rotation-inhibiting outer contour. In combination with the boundary structure 22 in the cage element 10 as well as the locking hooks 20, a rotation of the base element 30 is thus prevented.

The nut 40 is arranged adjacent to the first axial end 32 of the base element 30. In this example, the nut 40 also comprises the outer contour of a hexagon. The above explanations regarding the prevention of rotation of the base element 30 therefore apply analogously to the nut 40. It should be noted that, in particular via the locking hooks 20 in the cage element 10, the nut 40 may be arranged rotationally fixed but at the same time floatingly beared therein. In this way, a misalignment of the fastening screw 7 can be compensated when inserted into the adjustment unit 5. Since the nut 40 is beared floatingly, the adjustment unit 5 as a whole is arranged floatingly and, in relation to its longitudinal axis, is able to perform radial or lateral compensation movements within the cage element 10.

The assembled base unit 3 is shown in FIG. 6 in sectional view.

Figure 7:
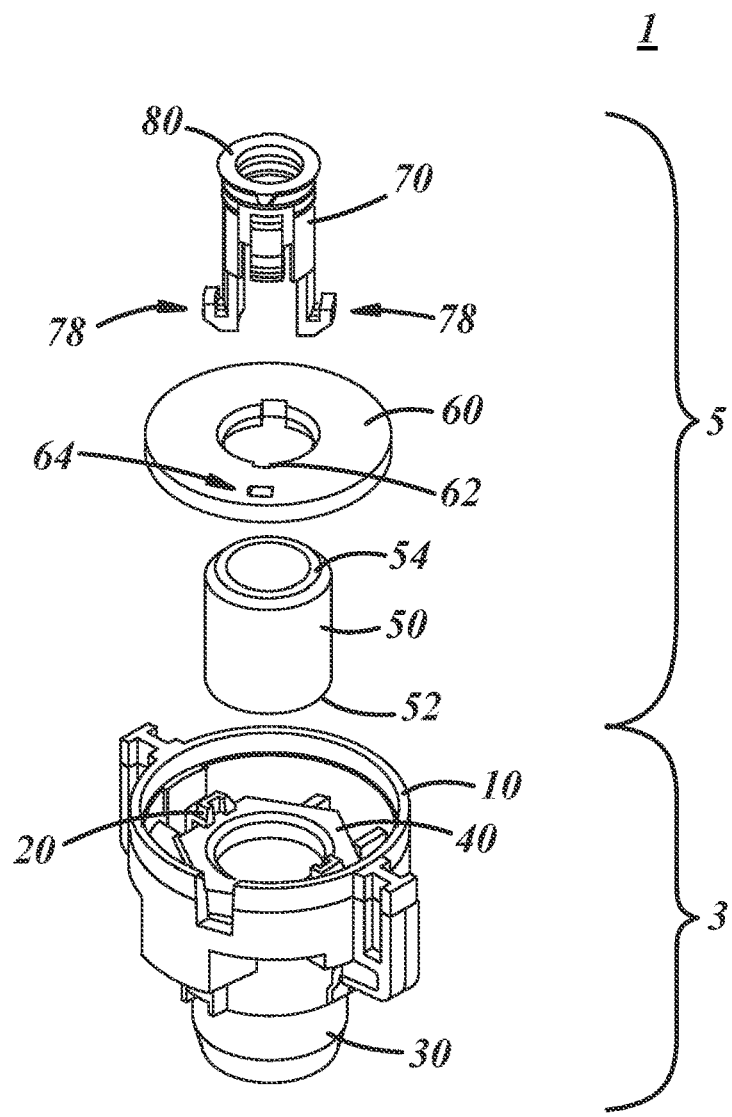

Now referring to FIG. 7, the adjustment unit 5, comprising the threaded sleeve washer 60 and dragging element 70, is now inserted into the base unit 3 comprised of cage element 10, base element 30 and nut 40. For this purpose, the threaded sleeve 50 is first screwed into the nut 40 with a first axial end 52 ahead, which may be until a defined projection of the second axial end 54 of the threaded sleeve 50 is present. The inner thread of the nut 40 and the outer thread of the threaded sleeve 50 thus form the first thread pairing of the first thread direction. For example, the inner thread of the nut 40 and the outer thread of the threaded sleeve are each a left-hand thread.

To simplify the assembly, the threaded sleeve 50 comprises a chamfer at both its first axial end 52 and its second axial end 54. This is because the assignment of the first 52 and the second axial end 54 is only clear when the threaded sleeve 50 is screwed into the nut 40.

Subsequently, the washer 60 is arranged on the second axial end 54 of the threaded sleeve 50. The washer 60 is aligned in such a way that a cam or lobe 64 is arranged between the stop 24 and the transport protection 26 of the cage element 10. The recess 18 in the cage element 10 can be used for orientation in this context, for example.

In a last step, the dragging element 70 is inserted into the threaded sleeve 50. Before this step is explained, however, the structure of the dragging element 70 is first discussed on the basis of FIGS. 9 to 14.

The dragging element 70 comprises in a known manner two spring arms 72 arranged opposite to each other. When used, a frictional dragging connection with the fastening screw 7 is achieved by means of the spring arms 72, wherein the fastening screw 7 presses the spring arms 72 radially outwards, accordingly.

In contrast to the previously known dragging elements, the dragging element 70 according to the embodiment shown comprises two axial extensions 76 at a first axial end 74. The axial extensions 76 thus extend opposite to the first thread direction or, in other words and with reference to the later tolerance compensation arrangement 1, in the direction of the second axial end 34 of the base element 30.

At the first axial end 74, the two axial extensions 76 each have a radially outwardly projecting projection 78. The dimensioning of the axial extensions 76 as well as the projections 78 results from the desired functionality. The axial extensions 76 must comprise a length sufficient for the first axial end 74 of the dragging element 70 to project beyond the first axial end 52 of the threaded sleeve 50 when in use. The projections 78 formed at the first axial end 74 must extend radially outwards far enough to prevent the threaded sleeve 50 from being unscrewed from the nut 40. Therefore, it is not sufficient if the projections 78 only extend outwards beyond the inner diameter of the threaded sleeve 50. Instead, they must extend at least beyond the core diameter of the outer thread of the threaded sleeve 50. In this way, a screwing out protection is provided. This is achieved, for example, by the projections 78 cutting into the inner thread of the nut 40 in the final state and which are clamped there.

Furthermore, the dragging element 70 comprises two radial projections 82 adjacent to the second axial end 80, which are arranged opposite to each other and which interact with two recesses 62 of the washer 60. In addition to a positionally correct assembly of the dragging element 70 in the washer 60 and thus in the adjustment unit 5, a rotation protection of the dragging element 70 in the washer 60 is thus realized.

Now, again with reference to FIG. 7, to insert the dragging element 70, the axial projections 76 are first pressed together. With the first axial end 74 ahead, the dragging element 70 is then inserted into the threaded sleeve 50 from the second axial end 54. In the assembled state, the projections 82 at the second axial end 80 of the dragging element 70 are arranged in the recesses 62 of the washer 60 and the second axial end 80 of the dragging element 70 is flush with the washer 60. In addition, the projections 78 at the first axial end 74 of the dragging element 70 are located outside the threaded sleeve 50 adjacent to the first axial end 52 of the threaded sleeve 50. Here, the dragging element 70 is retained in the threaded sleeve 50 by means of an interference fit as well as by means of a form-fit. With regard to the arrangement of the dragging element 70 by means of an interference fit in the threaded sleeve 50, reference is made to application DE 10 2007 037 242 A1. Here, it should be noted that the form-fit is not only present in the radial direction, but also in the axial direction due to the projection 78 as well as the design of the second axial end 80.

Figure 8:
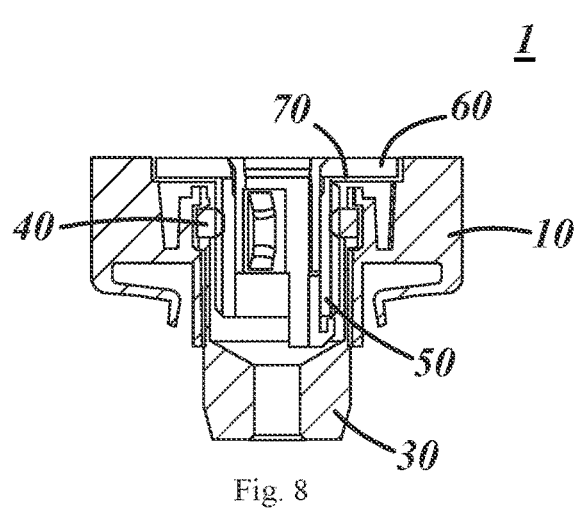
Figure 9:
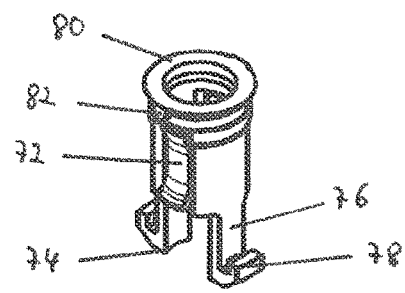
Figure 10:
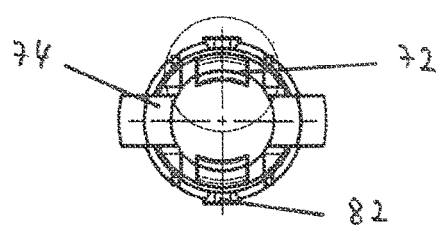
Figure 11:
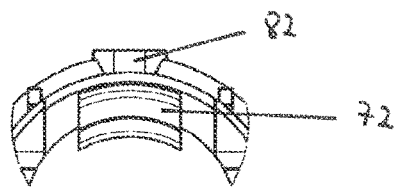
Figure 12:
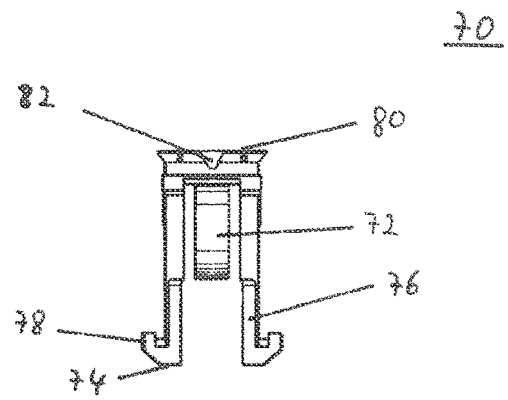
Figure 13:
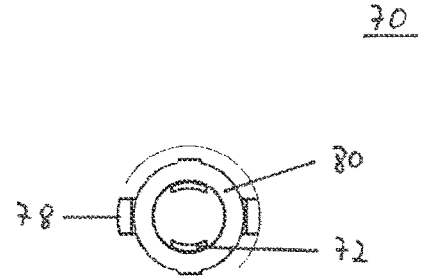
Figure 14:
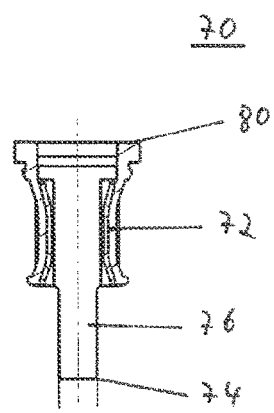

For the sake of completeness, FIG. 8 shows a sectional view of the tolerance compensation arrangement 1 thus formed.

Figure 16:
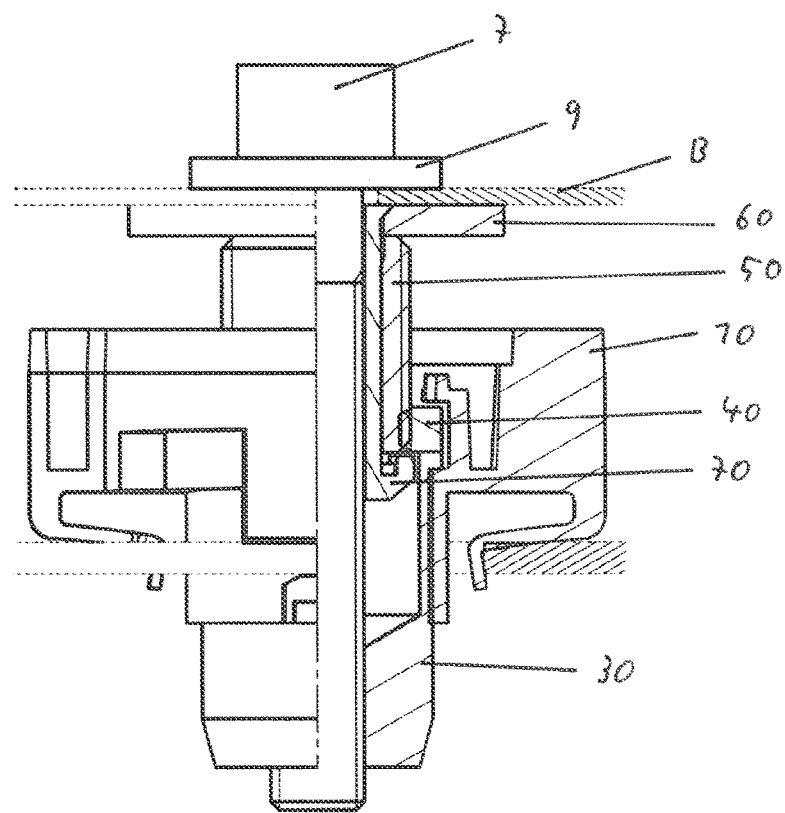

Now, referring to FIG. 16, the installation state of the tolerance compensation arrangement 1 is explained. As explained above, the cage element 10, and thus the tolerance compensation arrangement 1, has been fastened in the opening 90 in the first component A. Accordingly, the spring arms 16 are in engagement with the recesses 92 and the first component A is arranged between the first 12 and the second projection 14.

A second component B is arranged above the first component A, wherein an opening in the second component may be aligned with the opening 90 in the first component A. A fastening screw 7, which may be made of metal, is passed through the opening in the second component B to fasten the second component B and comes into engagement with the dragging element 70 of the adjustment unit 5.

Due to the spring arms 72, the fastening screw 7 forms a releasable dragging connection with the dragging element 70 so that, when the fastening screw 7 is rotated, the adjustment unit 5 is co-rotated and thus the adjustment unit 5 is moved into abutment with the second component B for tolerance compensation. When the fastening screw 7 is rotated further, and thus the dragging connection is overcome with a corresponding increase in torque, the fastening screw comes into engagement with the inner thread 36 of the base element 30 so that the two components can then be braced together by the fastening screw 7 via the adjustment unit 5. For the sake of completeness, it is noted that in the example shown, a spacer washer 9 is provided between a head of the fastening screw 7 and the second component B.

Based on the above explanation, the base element 30 thus interacts with the fastening screw 7 and thus forms the second thread pairing of the second thread direction. With respect to the first thread direction defined by a left-hand thread, the second thread direction is then defined by a right-hand thread. As both the first and the second thread pairing may be made of metal due to the choice of material explained at the beginning, higher strengths of the connection between the components A, B to be connected can be achieved compared to a pure plastic tolerance compensation arrangement.

Figure 17:
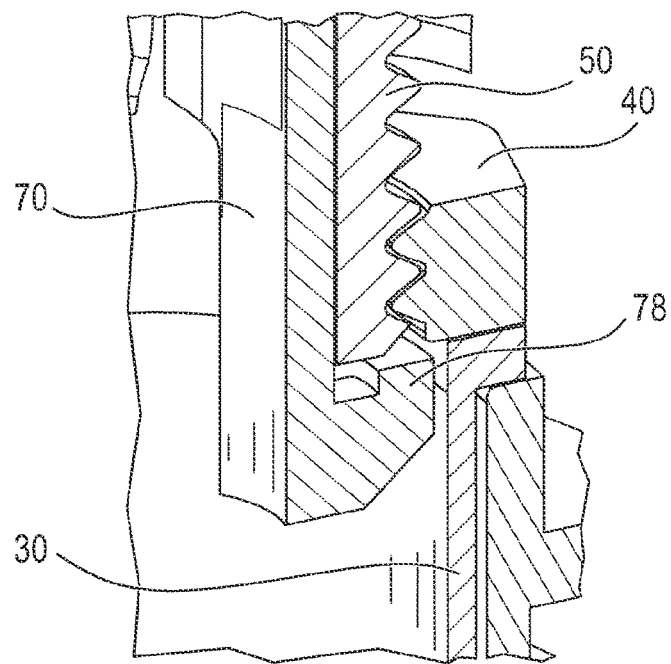
Figure 18:
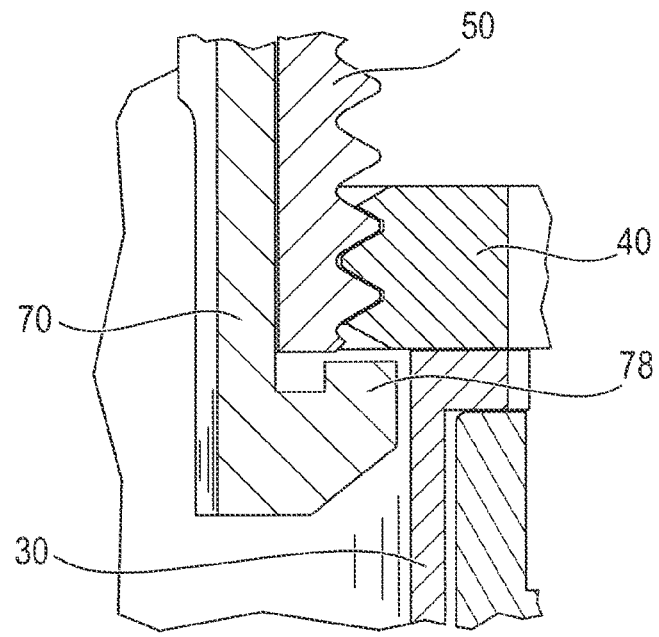

In FIGS. 17 and 18, a section of the tolerance compensation arrangement 1 at the nut 40 is shown to illustrate the function of the screwing out protection formed by the projections 78 on the dragging element 70. Here, the first axial end 52 of the threaded sleeve 50 is already engaged with the nut 40. Further rotation of the threaded sleeve 50 out of the nut 40 is prevented by the projections 78 of the dragging element 70 at the first axial end 74. Due to the extension of the projections 78 radially outwards beyond the core diameter of the outer thread of the threaded sleeve 50, they provide, for example, clamping faces which cut into the inner thread of the nut 40 and are clamped there firmly. This prevents further rotation of the adjustment unit 5 out of the base unit 3.

Figure 19:
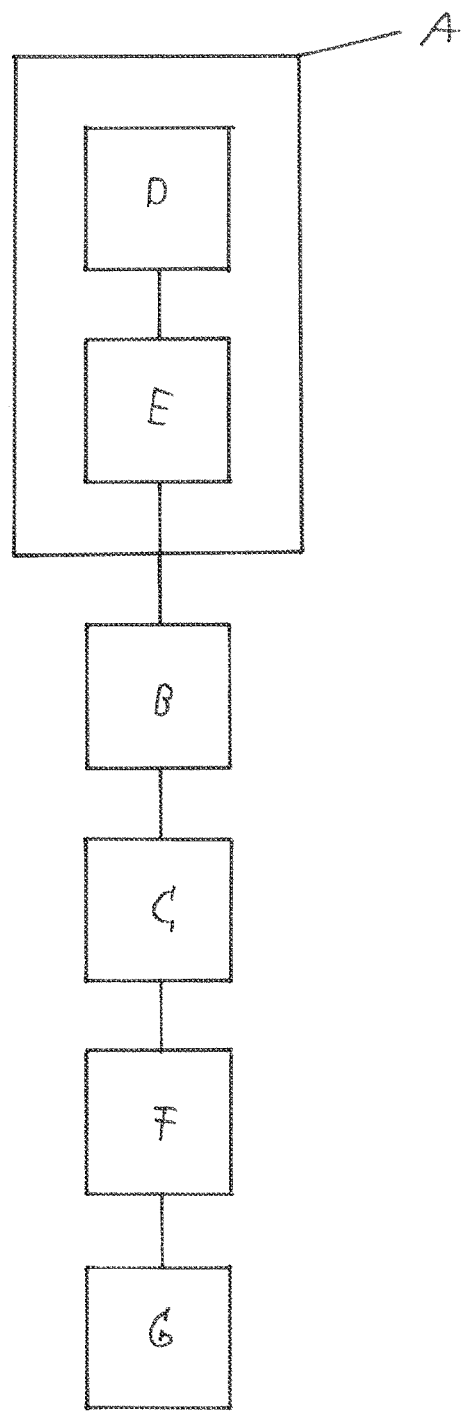

Finally and with reference to FIG. 19, an embodiment of a manufacturing method for the tolerance compensation arrangement 1 is explained. In a first step A, a base unit 3 comprised of a cage element 10, a base element 30 and a nut 40 is provided. The step of providing the base unit comprises in step D bending open the locking hooks 20 inside the cage element 10 as well as in step E inserting the base element 30 and the nut 40 into the cage element 10. The inserting is carried out in such a way that the base element 30 is arranged with a first axial end 32 in the cage element 10 and the nut 40 is arranged rotationally fixed and in a floatingly beared manner in the cage element 10 adjacent to the first axial end 32 of the base element 30. As explained above, after the base element 30 and the nut 40 have been inserted, the locking hooks 20 provide a loss protection for the base element 30 and the nut 40 in axial direction.

In step B, an adjustment unit 5, which comprises a threaded sleeve 50 with an outer thread and a dragging element 70 with a radially inwardly projecting spring arm 72, is provided.

In step C the threaded sleeve 50 is screwed into the nut 40, wherein the outer thread of the threaded sleeve 50 forms a first thread pairing of a first thread direction with the inner thread of the nut 40.

In step F a washer 60 is provided adjacent to a second axial end 54 of the threaded sleeve 50. An inserting of the dragging element 70 into the threaded sleeve 50 and the washer 60 is performed in step G, wherein the dragging element 70 comprises an axial extension 76 so that the dragging element 70 is arranged with a first axial end 74 adjacent to a first axial end 52 of the threaded sleeve 50. Together with the base unit 3, the axial extension 76 forms a screwing out protection of the adjustment unit 5. The dragging element 70 may be retained in and/or at the threaded sleeve 50 by means of an interference fit and/or by means of a form-fit. With regard to the arrangement of the dragging element 70 by means of an interference fit in the threaded sleeve 50, reference is again made to application DE 10 2007 037 242 A1.

The invention claimed is:

1. A tolerance compensation arrangement for fastening a first component to a second component with automatic compensation of tolerances in the distance between the first component and the second component, comprising the following features:
   a. a base unit with
      a1. a cage element comprising a first passage opening on the inside as well as a fastening structure on its outer side for fastening in the first component,
      a2. a base element which is arranged with a first axial end in the cage element and comprises an inner thread at the opposite second axial end, and
      a3. a nut, which is arranged rotationally fixed and in a floatingly beared manner in the cage element adjacent to the first axial end of the base element, wherein the nut provides an inner thread, and
   b. an adjustment unit comprising a threaded sleeve with an outer thread and a dragging element arranged therein with at least one radially inwardly projecting spring arm, wherein the outer thread of the threaded sleeve forms with the inner thread of the nut a first thread pairing of a first thread direction, wherein
   c. the adjustment unit comprises an axial extension opposite to the first thread direction, which forms with the base unit a screwing out protection of the adjustment unit, while
   d. a fastening screw is insertable through an opening of the base unit and of the adjustment unit, which fastening screw is screwable into the inner thread of the base element by means of a second thread pairing of a second thread direction opposite to the first one and is connectable to the adjustment unit via the dragging element by a releasable dragging connection, so that, when the fastening screw is screwed in, the adjustment unit is co-rotated and thereby moved into abutment with the second component.

2. The tolerance compensation arrangement according to claim 1, wherein the cage element comprises radially inwardly adjacent to a passage opening two locking hooks arranged opposite to each other, so that the first axial end of the base element and the nut are arranged between the locking hooks and a step in the interior of the cage element in an axial direction in a loss-proof manner.

3. The tolerance compensation arrangement according to one of the claim 1, wherein the dragging element comprises the axial extension so that the dragging element is arranged with a first axial end adjacent to a first axial end of the threaded sleeve.

4. The tolerance compensation arrangement according to claim 3, wherein the axial extension at least partially comprises a projection projecting radially outwards beyond the core diameter of the outer thread of the threaded sleeve.

5. The tolerance compensation arrangement according to claim 3, wherein the dragging element comprises two axial extensions, each of which comprises a projection projecting radially outwards beyond the core diameter of the outer thread of the threaded sleeve.

6. The tolerance compensation arrangement according to claim 1, in which the adjustment unit further comprises a washer adjacent to a second axial end of the threaded sleeve, wherein the dragging element is retained in and/or at the threaded sleeve by means of an interference fit and/or by means of a form-fit.

7. The tolerance compensation arrangement according to claim 6, wherein the second axial end of the dragging element is arranged flush with a first side of the washer.

8. The tolerance compensation arrangement according to claim 6, wherein the dragging element comprises, adjacent to the second axial end, one radial projection, wherein the least one radial projection interacts with a recess of the washer.

9. The tolerance compensation arrangement according to claim 1, wherein the base element, the nut, the threaded sleeve and the washer are made of metal.

10. A first component in combination with a tolerance compensation arrangement according to claim 1, wherein the tolerance compensation arrangement is fastened in the first component by means of the fastening structure of the cage element.

11. A first and a second component, which are fastened to each other via the tolerance compensation arrangement according to claim 1 and by means of a fastening screw.

12. A manufacturing method for a tolerance compensation arrangement according to claim 1, comprising the following steps:
 a. providing a base unit comprised of a cage element, a base element and a nut,
 b. providing an adjustment unit comprising a threaded sleeve with an outer thread and a dragging element with at least one radially inwardly projecting spring arm, thereafter
 c. screwing the threaded sleeve into the nut, wherein the outer thread of the threaded sleeve forms with the inner thread of the nut a first thread pairing of a first thread direction, wherein the adjustment unit comprises an axial extension opposite to the first thread direction which, together with the base unit, forms a screwing out protection of the adjustment unit.

13. The manufacturing method according to claim 12, wherein the step of providing the base unit comprises
 d. bending up locking hooks in the interior of the cage element,
 e. inserting the base element and the nut into the cage element so that the base element is arranged with a first axial end in the cage element and the nut is arranged in a rotationally fixed and floatingly beared manner in the cage element adjacent to the first axial end of the base element, wherein, after inserting the base element and the nut, the locking hooks provide a loss protection for the base element and the nut in axial direction.

14. The manufacturing method according to claim 12, which comprises the further steps:
 f. providing a washer adjacent to a first axial end of the threaded sleeve,
 g. inserting the dragging element into the threaded sleeve and into the washer, wherein the dragging element comprises the axial extension so that the dragging element is arranged with a first axial end adjacent to a first axial end of the threaded sleeve.

15. The manufacturing method according to claim 12, wherein the base element, the nut, the threaded sleeve and the washer are made of metal.

* * * * *